United States Patent
Daitoku et al.

[15] 3,679,148
[45] July 25, 1972

[54] LIGHT-INTERCEPTING MEANS IN A CAMERA CAPABLE OF COMBINATION WITH POWER DRIVEN FILM REWINDING MEANS

[72] Inventors: Kouichi Daitoku; Shuji Kimura, both of Tokyo, Japan

[73] Assignee: Nippon Kogaku K.K., Tokyo, Japan

[22] Filed: Dec. 8, 1970

[21] Appl. No.: 96,028

[30] Foreign Application Priority Data

Dec. 12, 1969 Japan..............................44/117538
Dec. 12, 1969 Japan..............................44/117539

[52] U.S. Cl...........................................................242/71.6
[51] Int. Cl...........................................................G03b 1/04
[58] Field of Search..............................242/71.1–71.7, 242/205; 352/75, 168; 95/11, 19, 31

[56] References Cited

UNITED STATES PATENTS

| | | | |
|---|---|---|---|
| 2,969,722 | 1/1961 | Schwartz | 95/31 |
| 3,137,457 | 6/1964 | Beach | 242/71.6 |
| 2,479,940 | 11/1969 | Nerwin | 95/31 |

*Primary Examiner*—Leonard D. Christian
*Attorney*—Ward, McElhannon, Brooks & Fitzpatrick

[57] ABSTRACT

A camera has an aperture in a wall thereof opposite one end of a spool of a film magazine holding chamber, and a cover assembly in the aperture prevents light from entering the camera, the cover assembly being operable to open the aperture for reception of a detachable power-driven film rewinding assembly, the latter assembly also preventing entry of light into the camera when it is mounted on the camera, wherefor the camera can be used with or without the power-driven assembly and the film can be rewound by a manually operable rewind knob or automatically by the power-driven rewinding assembly.

4 Claims, 8 Drawing Figures

3,679,148

LIGHT-INTERCEPTING MEANS IN A CAMERA CAPABLE OF COMBINATION WITH POWER DRIVEN FILM REWINDING MEANS

BACKGROUND OF THE INVENTION

1. Field of the Invention

This invention relates to a camera, and more particularly to a camera formed with an aperture for effecting power-driven film rewinding operation.

2. Description of the Prior Art

According to recent developments in the camera art, there has been a tendency to include in cameras power-driven film rewinding means as operable automatically by the film winding and shutter-release operations.

In view of such a tendency in the art, there is a strong need to provide power-driven film rewinding means which may be detachably mounted on those cameras which contains no such rewinding means to thereby achieve the same degree of performance as those cameras which have self-contained power-driven film rewinding means.

SUMMARY OF THE INVENTION

The present invention seeks to enable a camera containing therein no power-driven film rewinding means to be equipped with detachable power-driven film rewinding means, thereby permitting a power-driven film rewinding operation to be effected with such power-driven film rewinding means mounted on the camera, while also permitting the camera to be used singly or without the power-driven film rewinding means mounted thereon.

It is a first object of the present invention to provide a camera having an aperture formed through a body portion thereof opposed to a spool shaft in a film magazine containing chamber of the camera, and a light-intercepting cover openably mounted in that aperture to prevent the entry of any extraneous light therethrough, wherein prior to the power-driven film rewinding operation, the light-intercepting cover is opened, with power-driven film rewinding means mounted on the camera and thereafter a power-driven rewinding shaft is inserted through the aperture so that power-driven film rewinding can be accomplished by the combination of the camera and the power-driven film rewinding means while preventing the entry of extraneous light through the aperture.

It is a second object of the present invention to provide a camera having a light-intercepting cover which cannot be opened unless the back plate of the camera is opened and which prevents the entry of light when the camera is used singly, wherein the film rewinding operation may be accomplished by the use of a conventional rewind knob, but a power-driven rewinding operation is accomplished by removing the light-intercepting cover and inserting an interlocking rewind mechanism of power-driven film rewinding means through an aperture of the camera so as to engage a film magazine so that power-driven film rewinding may be effected by the drive of a motor.

According to a feature of the present invention, the camera may be provided with an aperture formed through a wall portion thereof opposed to one end of a spool in a film magazine containing chamber, a light-intercepting cover openably mounted in that aperture to prevent the entry of any extraneous light therethrough, a retainer member for retaining the light-intercepting cover, and a release member for releasing the retension of the retainer member.

According to a further feature of the present invention, the camera may comprise power-driven film rewinding means detachably mounted on the camera and having a power-driven member engageable and disengageable with the other end of the spool, the power-driven film rewinding means being adapted to completely intercept any light incident on the aperture of the camera when it is mounted on the camera.

These and other features of the present invention will become fully apparent from the following detailed description of embodiments thereof when taken in conjunction with the accompanying drawings.

DESCRIPTION OF THE PREFERRED EMBODIMENTS

Figure 1:
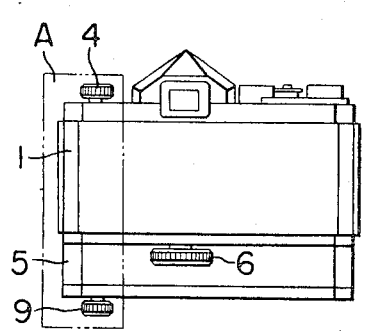
FIG. 1 is a rear view showing the appearance of a camera and power-driven film rewinding means combined together according to an embodiment of the present invention.
Figure 2:
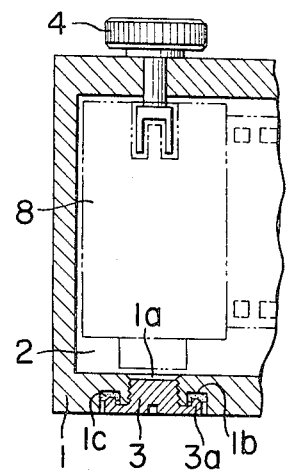
FIG. 2 is a fragmentary, vertical cross-sectional view of the portion A of FIG. 1 and showing the camera as it is used singly or without the power-driven rewinding means mounted thereon.
Figure 3:
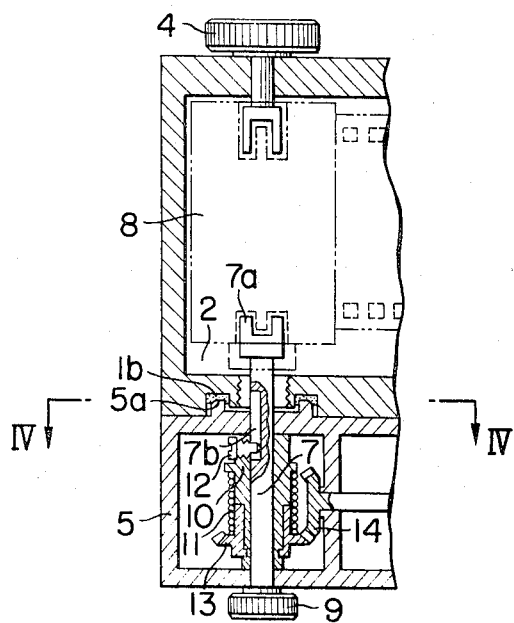
FIG. 3 is a fragmentary, vertical cross-sectional view showing the same portion of the camera with the power-driven rewinding means mounted thereon.
Figure 4:
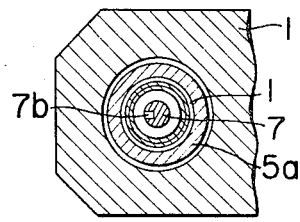
FIG. 4 is a fragmentary, horizontal cross-sectional view taken along lines IV — IV of FIG. 3.

Referring first to FIG. 2 rather than FIG. 1, a camera body 1 has an internally threaded aperture 1a formed in the lower wall thereof below a film magazine containing chamber 2, and the aperture 1a is shown closed by a light-intercepting cover 3 screwed into the aperture 1a so that any extraneous light may be completely intercepted when the camera is singly used in its ordinary mode of usage. A rewind knob 4 mounted in the upper wall of the camera body opposed to the lower wall is directed for use in the rewinding operation only when the camera is used in the condition as shown in FIG. 2, but the knob 4 is not resorted to when the camera is used in its other mode of usage with power-driven film rewinding means 5 mounted thereon as shown in FIGS. 1 and 3. The light intercepting cover 3 has an annular projection 3a formed circumferentially thereof, which is received in a complementary recess 1b forming a part of the aperture 1a so that a complete light interception may be achieved. For a more perfect light interception, a light-intercepting material 1c may be attached to the surface of the recess 1b.

Referring to FIGS. 1 and 3, the light-intercepting cover 3 is removed from the aperture 1a and in place thereof, power-driven film rewinding means 5 is mounted on the camera. As shown, the power-driven film rewinding means 5 has an annular projection 5a formed in a wall portion thereof, and when the power-driven film rewinding means 5 is mounted on the camera body 1 by the use of a tripod screw 6, the annular projection 5a is fitted in the annular recess 1b in the lower wall of the camera body 1 to thereby intercept any light. A power-driven rewinding shaft 7 extends vertically through the power-driven film rewinding means 5, and has a pawl 7a formed at one end thereof and engageable with the spool shaft in a film magazine 8. Secured to the other end of the power-driven rewinding shaft 7 is a knob 9 for lowering the pawl 7a to permit the loading of the film magazine 8 in the chamber 2. The power-driven rewinding shaft 7 is formed with a groove 7b and rotatable with a friction ring 10 while being axially slidable with respect to the friction ring 10 through the cooperation between the groove 7b and a limit pin 12 engaging the groove. A CLUTCH SPRING -- IS INTERPOSED BETWEEN THE FRICTION RING -) AND A BEVEL GEAR -0 ROTATABLY MOUNTED ON THE RING -), AND THE CLUTCH SPRING -- IS SUCH THAT IT IS WOUND UP WHEN THE BEVEL GEAR -0 IS ROTATED IN THE FILM- direction by a bevel gear 14 engaging the bevel gear 13 and connected to an unshown motor, and that it is unwound when the friction ring 10 is rotated in the film-rewinding direction by the rewind knob 4.

Where the camera is singly used without the power-driven film rewinding means 5 mounted thereon, the light-intercepting cover 3 is screwed into the aperture 1a and the rewind knob 4 is used to effect the rewinding operation. On the other hand, where the power-driven rewinding is to be effected, the light-intercepting cover 3 is removed from the aperture 1a and the power-driven film rewinding means 5 is mounted on the camera body in the manner as shown in FIG. 3. In the latter case, the loading of the film magazine 8 the magazine containing chamber 2 may be accomplished by downwardly moving the power-driven rewinding shaft 7 to retract the pawl 7a so as to permit the entry of the film magazine and thereafter moving the power-driven rewinding shaft 7 upwardly (as viewed) until the pawl 7a engages the spool shaft of the film magazine. Upon initiation of the power-driven rewinding operation, the drive of the unshown motor is transmitted to the bevel gear 13 through the bevel gear 14. The direction of rotation of the gears is the direction of winding of the clutch spring 11, so that the friction ring 10 is rotated thereby. This rotation of the friction ring 10 is transmitted through the limit pin 12 to the power-driven rewinding shaft 7 to thereby effect the film rewinding.

Where the film rewinding operation is to be effected manually, the rewind knob 4 may be manually actuated to rotate the power-driven rewinding shaft 7, and such rotation is transmitted through the limit pin 12 and the friction ring 10 to the clutch spring 11, which nevertheless does not transmit the rotation to the bevel gear 13 because the clutch spring 11 is then in the up-winding direction.

To effect the film winging operation, the power-driven rewinding shaft 7 is slid downwardly to disengage the pawl 7a from the spool shaft of the film magazine.

In the present embodiment, the light-intercepting cover 3 has been shown as a threaded type, whereas it should be understood that such cover may be either of some other detachable type such as bayonet or of the hinged type.

Figure 5:
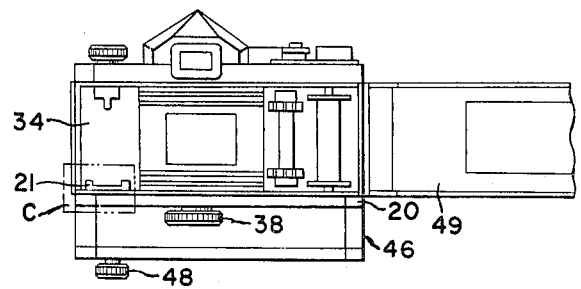
FIG. 5 is a rear view showing the appearance of camera according to another embodiment of the present invention, with the back plate of the camera being opened.
Figure 6:
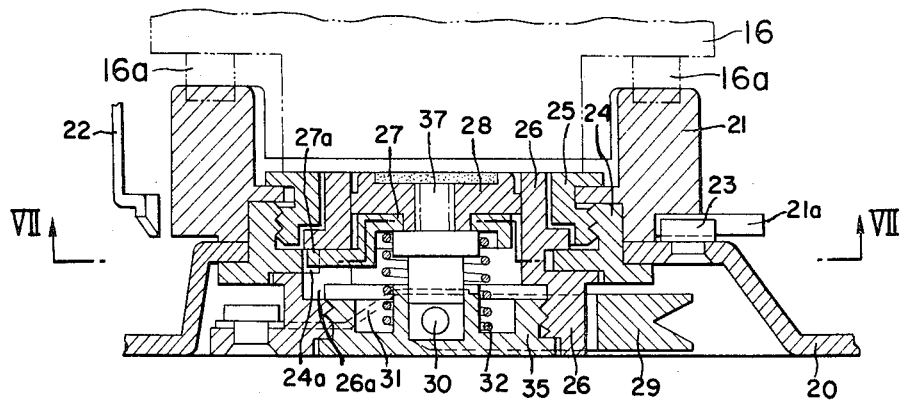
FIG. 6 is an enlarged, vertical cross-sectional view showing the portion C of FIG. 5, i.e., the portion underlying the film magazine containing chamber.
Figure 7:
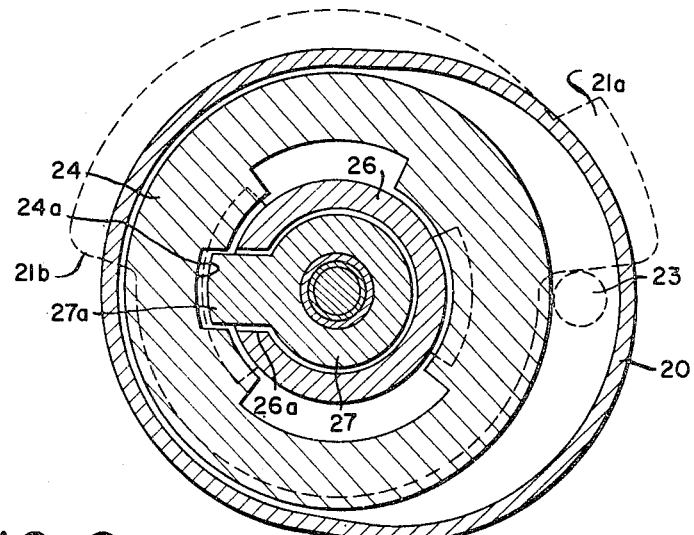
FIG. 7 is a horizontal cross-sectional view taken along lines VII —VII of FIG. 6.

Referring now to FIGS. 5, 6 and 7, there is shown another embodiment of the present invention in which the camera body has a bottom plate 20 secured thereto. A film magazine receiver 21 has two projections formed circumferentially thereof. The arrangement of this alternative embodiment is such that when the film magazine receiver 21 is rotated an unshown aperture in a film magazine 16 is closed by pins 16a formed in the film magazine 16 and the circumferential projections 21a upwardly displaces a key lever 22 for locking the back plate 4a of the camera, thereby releasing the back plate from the locking of the key lever 22. A recess 21b is formed in the film magazine receiver 21 to limit the rotation thereof (FIG. 7). A limit pin 23 is secured to the bottom plate 20 of the camera, and this pin 23 cooperates with the projection 21a and the recess 21b to determine the angle of rotation of the film magazine receiver 21. An outer or female bayonet 24 is mounted together with the film magazine receiver 21, by means of a nut 25, with the bottom plate 20 disposed therebetween. The bayonet 24 is rotatable with respect to the bottom plate 20 within the limit of rotation provided by the recess 21b. The outer bayonet 24 also has a recess 24a formed in the lower inner wall thereof and engageable with a projection 27a formed in a lock lever 27. The bottom plate 20, the film magazine receiver 21, the outer bayonet 24 and the nut 25 are always maintained attached to the camera body. The inner walls of the outer bayonet 24 and nut 25 define an opening extending from a film magazine containing chamber 34 to the exterior of the camera body. An inner or male bayonet 26 is inserted into the outer or female bayonet 24 and into the film magazine receiver 25 so as to establish a bayonet-coupling with the outer bayonet 24.

As shown in FIG. 26, the inner bayonet 7 has a cut-away 26a formed partly axially thereof so as to receive therein the projection 27a of the lock lever 27 coaxial with a push button 28, which will be described later, and permit the axial displacement of the lock lever 27. The lock lever 27 provides a retainer member in the sense that the projection 27a thereof engages the recess 24a of the outer bayonet 24 to stop the rotation of the inner bayonet 26 and accordingly the relative rotation between the inner and outer bayonets, thus preventing the removal of a light-intercepting cover. A pawl 29 for opening and closing the back plate of the camera is pivotally connected to the inner bayonet 26 by means of a pin 30 and it is held in operative and inoperative positions by the force of a click plate spring 31. The push button 28 is coaxial and slidable with respect to the inner wall of the inner bayonet 26 and has a coaxial slide shaft 37 fitted therein with the lock lever 27 interposed between the push button 28 and the inner bayonet 26. The push button 28 is of such construction that it is biased upwardly by a coil spring 33 so as to maintain the projection 27a of the lock lever 27 in engagement with the upper end of the cut-away 26a formed in the inner bayonet 26, and that if the push button 28 is moved downwardly with respect to the film magazine containing chamber 34 against the force of the coil spring 32 the projection 27a of the lock lever 27 will be disengaged from the recess 24a of the outer bayonet 24 to allow the rotation of the inner bayonet 26. It will thus be noted that the push button 28 provides a release member for releasing the retention of the aforesaid retainer member, i.e., the lock lever 27. The coil spring 33 is secured at the lower end thereof to a spring receiver 35 screwed into the inner bayonet 26. Thus, a detachable light-intercepting cover is provided by the described arrangement of inner bayonet 26, lock lever 27, pawl 29 for opening and closing the back plate of the camera, click plate spring 31, pin 30, push button 28, slide shaft 37, coil spring 33 and spring receiver 35.

With the light-intercepting cover mounted to the camera body as shown in FIGS. 6 and 7, the pawl 29 for opening and closing the camera's back plate may be cocked and rotated into operative position against the force of the click plate spring 31, so that the film magazine receiver 21 is rotated through the pin 30, inner bayonet 7, cut-away 26a, projection 27a of lock lever 27, recess 24a and outer bayonet 24. Thus, the rotation of the film magazine receiver 21 results in the opening or closing of the aperture in the film magazine 16 and the retention or release of the back plate of the camera. In that case, the outer and inner bayonets 24 and 26 are rotated together by means of the projection 27a of the lock lever 27.

To open the light-intercepting cover in order to insert the power-driven rewinding shaft 36 of the power-driven film rewinding means, the pawl 29 is cocked and rotated into a position for releasing the camera's back plate in the described manner, to thereby open the back plate. Then the push button 28 is pushed against the bias of the coil spring 32 to release the engagement between the projection 27a of the lock lever 27 and the recess 24a of the outer bayonet 24.

Subsequently, when the pawl 29 is further rotated in the direction for releasing the retention, the outer bayonet 24 is no longer rotatable with the recess 21b of the film magazine receiver 21 restrained by the limit pin 23 while the inner bayonet 26 is rotated to release its bayonet-coupling with the outer bayonet 24. Thus, the light-intercepting cover can now be opened.

To close the light-intercepting cover, the push button 28 is depressed and rotated in the direction opposite to the direction of rotation previously described for opening that cover. The inner bayonet 26 is thus rotated with the outer bayonet 24 until the latter's rotation is stopped by the limit pin 23 to thereby establish a bayonet-coupling between the two bayonets. At this point of time, when the push button 28 is released, the coil spring 32 displaces the push button 28, lock lever 27 and slide shaft 37 so that the projection 27a of the lock lever 27 engages the recess 24a of the outer bayonet 24 to retain the outer and inner bayonets 24 and 26 in engagement with each other. Thus, the light-intercepting cover is now closed.

Figure 8:
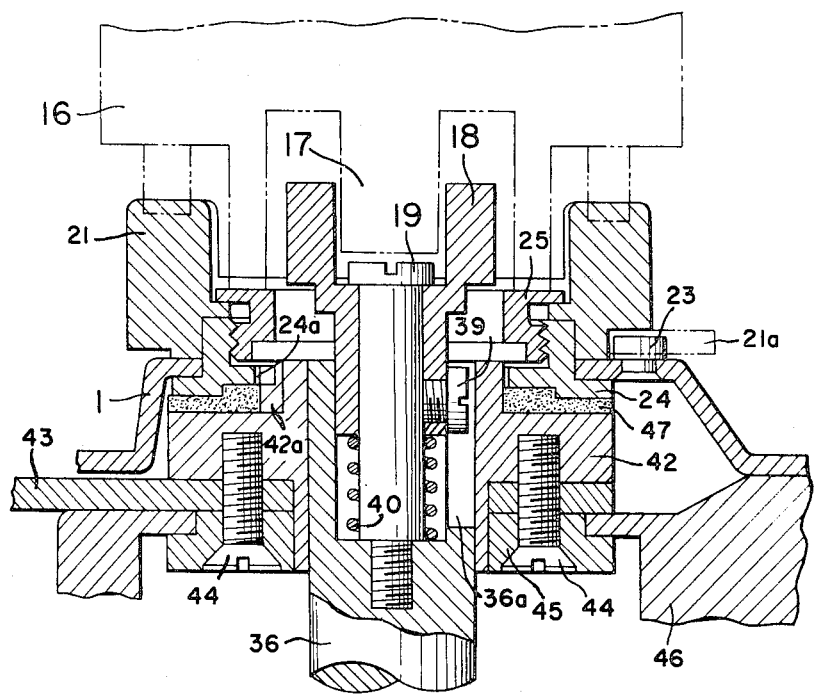
FIG. 8 is an enlarged, vertical cross-sectional view showing the portion C of FIG. 5 with the power-driven film rewinding means mounted thereon.

Description will now be made of the case where the power-driven film rewinding means has been mounted on the camera by means of a tripod screw 38 (FIG. 5). Referring to FIG. 8, the power-driven rewinding shaft 36 of the power-driven film rewinding means is shown coupled to the aperture formed in the film magazine containing chamber. As shown, a film magazine 16 is of the type which has a projection 17 formed at one end of the spool shaft. The projection 17 is engaged by one end of a coupling 18 which transmits its rotation to the spool shaft of the film magazine 16. A shaft 19 is inserted through the other end of the coupling 18, one end of which is threadedly fitted to a power-driven rewinding shaft 36. A screw 39, threaded into the lower side wall of the coupling, is fitted in the groove 36a formed axially of the power-driven rewind shaft 36 so that rotation of the shaft 36 is transmitted to the coupling 18 by engagement of the screw 39 and the groove 36a, and axial movement of the shaft 19 is permitted. An upwardly biasing coil spring 40 is disposed between the power-driven rewinding shaft 36 and the coupling 18 so as to bias the shaft 19 upwardly. The upward movement of the coupling 18 is limited by the enlarged top of the shaft 19. The axially slidable arrangement of the coupling 18 is intended to readily permit the engagement between the coupling 18 and the spool shaft projection 17 of the film magazine 16. The power-driven film rewinding means 36 is connected to an unshown motor and fitted for rotation and axial movement within an interlocking ring 42 for opening and closing the camera's back plate. The ring 42 has an upward projection 42a of a reduced diameter formed at one end thereof and engaging the recess 24a of the outer bayonet 24. An operating lever 43 fixed to the ring 42 by screws 44 serves as the pawl 9 of the light intercepting cover. A seat 45 is secured, together with the operating lever 43, to the ring 42 by means of screws 44 in such a manner that the members 45, 25 and 43 are all rotatable with respect to the body 46 of the power-driven film rewinding means. The operating lever 43 is projected outwardly of the power-driven film rewinding means and rotatable between the position for releasing the camera's back plate and the position for retaining the same plate. A light-intercepting material 47 is provided between the ring 43 and the outer bayonet 24 to prevent the entry of any extraneous light through the aperture. The parts indicated by the other reference numerals in FIG. 8 are the same as those appearing in FIG. 6.

With the described arrangement, the operating lever 43 may be rotated to the position for releasing the camera's back plate or to the position for retaining the same plate, to thereby rotate the outer or female bayonet 24 whose recess 24a is engaged by the projection 42a of the ring 42. Thus, the film magazine receiver 21 with its projection 21a is rotated so that the opening or closing of the aperture of the film magazine 16 and the release and retaining of the camera's back plate are accomplished in the same way as described with respect to FIG. 6.

To effect the power-driven film rewinding operation, the power-driven rewinding shaft 36 is pressed inwardly with the operating lever 43 maintained in the retaining position and then the power-driven film rewinding means is actuated to rotate the power-driven rewinding shaft 36, whereby the coupling 18 automatically engages the spool shaft projection 17 to rewind the film into the film magazine 16.

To effect the ordinary film winding operation, the power-driven rewinding shaft 36 may be moved down by manually grasping a knob 48 to thereby release the engagement between the coupling 18 and the projection 17 (FIGS. 5 and 8) or alternatively, a clutch mechanism may be provided between the unshown motor and the power-driven rewinding shaft 36 to that no load may be imparted during the winding operation. In order to detach the power-driven rewinding shaft 36 of the power-driven film rewinding means, the operating lever 43 may be rotated to the position for releasing the camers's back plate and then the outer bayonet 24 is also brought into such position as described with respect to FIG. 6. This is also the case with the mounting of the power-driven film rewinding means.

Thus, according to the present invention, the entry of light into the camera can be completely prevented by the combination of a camera and detachable power-driven film rewinding means and the camera may also be used singly without such rewinding means mounted thereon to achieve the same result as that attained by any ordinary camera. Moreover, the camera itself requires no change or modification of its manually operable wind-rewind system and its components except some very simple and slight changes in certain parts, and this means a great convenience to the user of cameras.

Further, according particularly to the second embodiment of the present invention, the light-intercepting cover fitted in the aperture extending from the film magazine containing chamber to the exterior of the camera body cannot be opened unless the camera's back plate is opened, and thus it cannot occur that the light-intercepting cover is inadvertently removed from the camera body during the photographing operation to thereby fatally expose the film in the camera to the extraneous light. Also, a higher degree of safety against the extraneous light may be attained by the present invention when combined with a camera's back plate provided with a releasing-retaining mechanism to prevent any inadvertent opening of the back plate as disclosed in the second embodiment.

What is claimed is:

1. A photographic camera comprising
a housing having a film supply chamber into which a film magazine having a spool therein inserted and back cover means capable of opening and closing said housing;
a first wall of said housing opposed to one of the ends of said spool;
a manually operating member rotatably supported by said first wall and engageable with said one end of said spool for manually rewinding the film;
a second wall of said housing opposed to said first wall, said magazine being interposed between said first and said second wall;
an aperture formed in said second wall;
power-driven film rewinding means detachably mounted on said housing, said power-driven film rewinding means being attached lighttightly on said housing and being connected with the other end of said spool through said aperture; and
plug means attachable on said second wall for opening and closing said aperture, said plug means being attached lighttightly on said housing when said power-driven film rewinding means is detached from said housing.

2. A camera as defined in claim 1, wherein said power-driven film rewinding means includes a power-driven shaft engageable with said other end of said spool.

3. A camera as defined in claim 1, wherein said plug means includes a plug member detachably mountable in said aperture and locking means for preventing removal of said plug member and unlocking means operable by hand within said film supply chamber to unlock said locking means when said back cover means is opened.

4. A camera as defined in claim 2, wherein said power-driven shaft has an axial groove on its periphery, said power-driven film rewinding means further including a cylinder driven by the motor and holding said power-driven shaft and a pin slidably fitted into said axial groove of said power-driven shaft, whereby said power-driven shaft is withdrawn from said film supply chamber when the magazine is inserted into said film supply chamber.

* * * * *

O-96-N

UNITED STATES PATENT OFFICE
CERTIFICATE OF CORRECTION

Patent No. 3,679,148      Dated July 25th, 1972

Inventor(s) KOUICHI DAITOKU and SHUJI KIMURA

It is certified that error appears in the above-identified patent and that said Letters Patent are hereby corrected as shown below:

Column 2, lines 67 through 71, change "A CLUTCH SPRING -- IS INTERPOSED BETWEEN THE FRICTION RING -) AND A BEVEL GEAR -0 ROTATABLY MOUNTED ON THE RING -), AND THE CLUTCH SPRING -- IS SUCH THAT IT IS WOUND UP WHEN THE BEVEL GEAR -0 IS ROTATED IN THE FILM-" to -- A clutch spring 11 is interposed between the friction ring 10 and a bevel gear 13 rotatably mounted on the ring 10, and the clutch spring 11 is such that it is wound up when the bevel gear 13 is rotated in the film-rewinding --. Column 3, line 70, change "Fig. 26" to -- Fig. 7 --; same line, change "bayonet 7" to -- bayonet 26 --.

Signed and sealed this 9th day of January 1973.

(SEAL)
Attest:

EDWARD M. FLETCHER, JR.
Attesting Officer

ROBERT GOTTSCHALK
Commissioner of Patents